INVENTOR
R. W. CHANG
BY J. P. Kearns
ATTORNEY

United States Patent Office 3,488,445
Patented Jan. 6, 1970

3,488,445

ORTHOGONAL FREQUENCY MULTIPLEX DATA TRANSMISSION SYSTEM

Robert W. Chang, Eatontown, N.J., assignor to Bell Telephone Laboratories, Incorporated, Murray Hill, N.J., a corporation of New York Filed Nov. 14, 1966, Ser. No. 594,042
Int. Cl. H04j *1/00;* H04b *1/66*
U.S. Cl. 179—15 10 Claims

ABSTRACT OF THE DISCLOSURE

Apparatus and method for frequency multiplexing of a plurality of data signals simultaneously on a plurality of mutually orthogonal carrier waves such that overlapping, but band-limited, frequency spectra are produced without causing interchannel and intersymbol interference. Amplitude and phase characteristics of narrow-band filters are specified for each channel in terms of their symmetries alone. The same signal protection against channel noise is provided as though the signals in each channel were transmitted through an independent medium and intersymbol interference were eliminated by reducing the data rate. As the number of channels is increased, the overall data rate approaches the theoretical maximum.

This invention relates to systems for transmitting multiple channels of information signals over band-limited transmission media.

Multiplex transmission systems employing sinusoidal carriers separated in frequency, or rectangular pulse carriers separated in time, or combinations thereof, are well known. These known systems have the common characteristic that in order to avoid mutual interference among the channels guard bands of frequency or time are provided between channels. These guard bands represent a waste of valuable and limited bandwidth.

In digital data transmission, for example, it is common practice to transmit a plurality of data channels through a single band-limited transmission medium. In view of the limtation of frequency bandwidth in practical transmission media, the problem of maximization of the overall data rate and the concomitant minimization of interchannel and intersymbol interference arises. The general solution has been to center the individual channels on equally spaced carrier frequencies and to provide a finite guard band between channels. This has meant limiting the usable bandwidth of each channel to somewhat less than the carrier wave spacing in order to avoid interchannel interference in the frequency domain. The overall data rate is therefore much less than that attainable if the guard space could be eliminated without causing interference.

In the time domain, on the other hand, because the impulse response of band-limited transmission media is spread out in time, the signalling rate is generally held below the theoretical maximum in order to avoid intersymbol interference.

It is one object of this invention to define a new class of band-limited signals capable of being transmitted in parallel channels at substantally the maximum possible data rate without incurring either interchannel or intersymbol interference.

It is another object of this invention to so shape the spectra of individual signaling channels that the spectra of adjacent channels by virute of their orthogonality can overlap without producing interchannel interference.

It is still another object of this invention to render the elimination of interchannel and intersymbol interference in frequency multiplexed parallel data signaling channels independent of the phase characteristic of the transmission medium.

It is yet another object of this invention to achieve an overall date rate in a band-limited transmission medium approaching the theoretical maximum rate with physically realizable filters having smooth amplitude rolloffs and arbitrary phase characteristics.

It is a further object of this invention to so shape the response functions of adjacent channels in a frequency multiplex transmission system that the distance between any two sets of received signals in the signal space available defined by vectors representing all possible signals present at one time and which must be individually distinguishable is the same as if the signals in each channel were transmitted through independent media and intersymbol interference were eliminated by reducing the signaling rate. The concept of signal space is discussed more fully by J. R. Davey in his paper "Digital Data Signal Space Diagrams" published in the Bell System Technical Journal (vol. XLIII, No. 6, November 1964) at p. 2973.

According to this invention, a plurality of data signal samples are orthogonally multiplexed on equally spaced carrier frequencies for transmission over a band-limited transmission medium in channels having overlapping frequency spectra. Because of the orthogonal relationships achieved within and between channels intersymbol and interchannel interferences are avoided and a theoretically maximum data transmission rate is attained in each channel.

Orthogonality is a mathematical concept derived from the vector representation of time-dependent waveforms. Any two vectors are orthogonal if the cosine of the angle between them is zero, i.e., they are perpendicular to each other. The test for orthogonality between vectors is that the product of their amplitudes (lengths) and the cosine of the angle formed between them when their points of beginning are brought to a common origin without changing their relative directions is zero. Periodic waveforms, such as sine and cosine waves, are commonly represented by vectors. More complex waveforms can by the well-known methods of Fourier analysis be represented by summations of sine and cosine terms. Both simple and complex waveforms can be tested for orthogonality by analogy with the vector multiplication mentioned above. If the periodic waveforms to be compared are laid out on the time axis and the average of the integral of the products of pairs of values for all instants of time extending over their common period is taken, and this average is found to be zero, then the waveforms are said to be orthogonal. Thus, orthogonality becomes a broader concept than perpendicularity. In general, two time-dependent waveforms $S_m(t)$ and $S_n(t)$ and deemed to be orthogonal if $$\frac{1}{2T}\int_{-T}^{T} S_m(t)S_n(t)dt=0$$

for $m \neq n$ over the interval 2T, the common repetition period.

Closely allied with the orthogonality concept is that of symmetry. A function $f(t)$, which can be represented graphically by a waveform and is defined on an interval centered at the origin ($t=0$), is said to be even if $$f(-t)=f(t)$$

for all values of $t$ in the assigned interval, and odd if $$f(-t)=-f(t)$$

In graphic terms even functions are symmetric about vertical axis erected at the origin, i.e., the negative half is the mirror image of the positive half. Odd functions are symmetric about the origin itself, i.e., are skew symmetric. From this it follows that the product of two even functions is even whenever both functions are even or both are odd, and is odd whenever one of the functions is even and the other is odd. Summarizing, (Even)(Even)=(Odd)(Odd)=Even
(Even)(Odd)=(Odd)(Even)=Odd It can therefore be further stated from the orthogonality integral above that whenever the function $S_m(t)$ is of opposite parity to the function $S_n(t)$ and both are centered in a common interval, they are mutually orthogonal. Since the interval is common to both functions and both functions are periodic with respect to this interval, the implication is that the two functions are synchronized.

The orthogonality concept is not limited to two functions. Any number of functions can be mutually orthogonal and mutually synchronized in a common interval.

Orthogonality with respect to time within each channel and with respect to frequency between channels is preserved by shaping the signals applied to each channel such that the integral of the mathematically transformed product of the squares of the shaping function applied to the individual channel and the channel transfer function and the integral of the transformed products of the shaping functions applied to adjacent channels and the square of the channel transfer function are each zero. These conditions are met in practical cases by shaping functions whose squares have even symmetry about the channel center frequencies and odd symmetry about frequencies located halfway between the channel center frequency and the channel band-edge frequencies. At the same time the phase characteristics of adjacent channels may be arbitrary, provided only that their phase characteristics differ by ninety electrical degrees plus an arbitrary phase function with odd symmetry about the frequency midway between the channel center frequencies.

The required symmetries are achievable in a half-cycle of the cosine wave whose square is the raised cosine shaping function as one readily definable illustrative example.

Preservation of orthogonality within each channel permits establishing individual channel data transmission rates equal to the channel bandwidth. This is half the ideal Nyqquist rate. However, due to the fact that adjacent channels are synchronized, they can be overlapped by 50 percent. The overall data transmission rate for the full channel bandwidth then becomes the ideal Nyquist rate times the ratio of the number of channels to the number of channels plus one.

Inasmuch as the amplitudes of the shaping functions are proportional to the amplitudes of the samples by which they are multiplied, transmission is in no way restricted to binary digits. Multilevel symbols and symbols of arbitrary height derived from analog samples are equally transmissible.

Orthogonal signals are readily detectable by correlation procedures using matched filter techniques.

A feature of this invention is that the band-limited shaping filters for each channel can be identical.

Another feature of this invention is that the amplitude and phase characteristics of the transmitting filters can be synthesized independently.

A particular advantage of the orthogonal multiplex transmission system of this invention is that received signals can be recovered by using adaptive correlators regardless of the phase distortion arising in the transmission medium. In addition, synchronization problems are minimized because stationary phase differences between modulating and demodulating carrier waves are taken into account by the adaptive correlators.

Other objects, features and advantages of this invention will be readily appreciated from a consideration of the following detailed description and the accompanying drawing in which.

Figure 1:
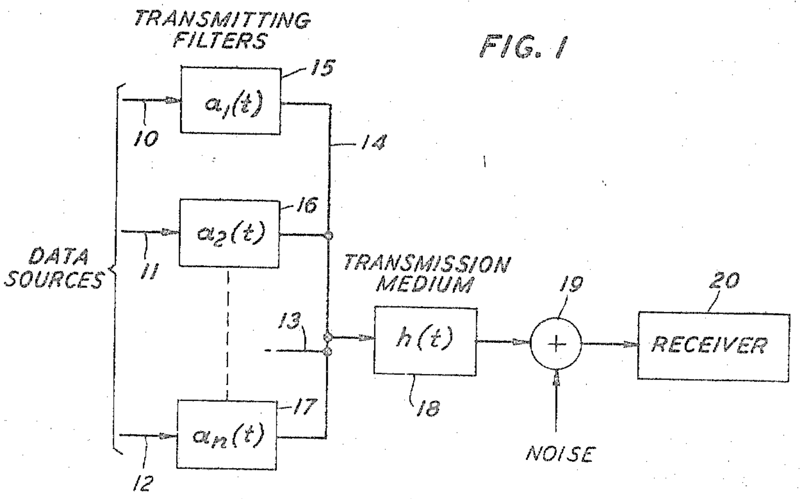
FIG. 1 is a block diagram of the basic orthogonal frequency-multiplex transmission system of this invention.

FIG. 1 is a generalized block diagram of an orthogonal multiplex data transmission system according to this invention. From data sources on the left (not shown) impulse samples are applied in synchronism on a plurality of lines such as those designated 10, 11 and 12. Each impulse is shaped in associated transmitting filters 15, 16, and 17 and others not shown for additional sources. Line 13 symbolically indicates such other signaling channels. The passbands of the several transmitting filters are centered at equally spaced frequencies with the spacing equal to half the data rate per channel. Their outputs are combined on line 14 and applied to common transmission medium 18, having an impulse response $h(t)$ and a transfer function $$H(f)e^{J\eta(t)}$$

where $H(f)$ and $\eta(f)$ are respectively the amplitude and phase characteristics of medium 18, $e$ is the base of natural logarithms and J is the imaginary number $\sqrt{-1}$. Noise is also added at various points in the system as indicated symbolically by adder 19. The several signaling channels are separately detected in receiver 20. It is assumed for the present that the channel with the lowest frequency is operating at baseband. Carrier modulation and demodulation at passband can be accomplished by standard techniques.

Channel shaping is the critical element here. Let $b_0, b_1, b_2 \ldots$ be a sequence of $m$-ary signal digits ($m \geqq 2$) or a sequence of analog samples to be transmitted over an arbitrary $i$th channel. Each of $b_0, b_1, b_2 \ldots$ can be represented by an impulse with height proportional to that of the corresponding sample. These impulses are applied to the $i$th transmitting filter at the rate of one impulse every T seconds (data rate per channel equals $1/T$ bauds). Let $a_i(t)$ be the impulse response of the associated $i$th transmitting filter. Then this filter transmits a sequence of signals as $$b_0a_i(t),\ b_1a_i(t-T),\ b_2a_i(t-2T)\ \ldots$$

The received signals at the output of transmission medium 18 are $$b_0u_i(t),\ b_1u_i(t-T),\ b_2u_i(t-2T)\ \ldots$$

where $$u_i(t)=\int_{-\infty}^{\infty} h(t-\tau)a_i(\tau)d\tau$$

($\tau$ is a dummy variable of integration.)

These received signals overlap in time, but they are orthogonal (noninterfering) if $$\int_{-\infty}^{\infty} u_i(t)u_i(t-kT)dt=0,\ k=\pm 1,\ \pm 2\ \ldots \quad (1)$$

Intersymbol interference in the $i$th channel is eliminated if Equation 1 is satisfied.

Now let $c_0, c_1, c_2 \ldots$ be the $m$-ary signal digits or analog samples transmitted over an adjacent $j$th channel which has a transmitting filter impulse response of $a_j(t)$. Since all signaling channels are assumed to be synchronized, the $j$th transmitting filter transmits a sequence of signals $$c_0a_j(t),\ c_1a_j(t-T),\ c_2a_j(t-2T)\ \ldots$$

The received signals at the output of medium 18 are now $$c_0u_j(t),\ c_1u_j(t-T),\ c_2u_j(t-2T)\ \ldots$$

Although these signals overlap those of the $i$th channel in both time and frequency, they are nevertheless mutually orthogonal if $$\int_{-\infty}^{\infty} u_i(t)u_j(t-kT)dt=0,\ k=0,\ \pm1,\ \pm2\ldots \quad (2)$$

Intersymbol and interchannel interference can be simultaneously eliminated if Equation 1 is satisfied for all $i$ and Equation 2, for all $i$ and j ($i\neq j$).

By well known principles of Fourier transform analysis Equations 1 and 2 can be transformed into the frequency domain, such that Equation 1 becomes $$\int_0^{\infty} A_i^2(f)H^2(f)\cos 2\pi fkTdf=0 \quad (3)$$

for $k=1, 2, 3 \ldots, i=1, 2, 3 \ldots N$; and Equation 2 becomes $$\int_0^{\infty} A_i(f)A_j(f)H^2(f)\cos[\alpha_i(f)-\alpha_j(f)]\cos 2\pi fkTdf=0$$
(real part) (4)

and $$\int_0^{\infty} A_i(f)A_j(f)H^2(f)\sin[\alpha_i(f)-\alpha_j(f)]\sin 2\pi fkTdf=0$$
(imaginary part) (5)

for $$k=0,\ 1,\ 2\ \ldots$$
$$i,\ j=1,\ 2\ \ldots N,\ i\neq j$$

In Equations 3, 4, and 5 $A_i(f)$ *is* the amplitude characteristic and $\alpha_i(f)$ is the phase characteristic of the $i$th transmitting filter. $A_j(f)$ and $\alpha_j(f)$ for the $j$th transmitting filter are similarly defined. $H(f)$ is the amplitude characteristic of medium 18.

Let $f_i(i=1, 2, 3 \ldots N)$ denote the equally spaced center frequencies of the N independent signaling channels. Let the lowest channel center frequency be $$f_1=\left(h+\frac{1}{2}\right)f_s \quad (6)$$

where $h$ is zero or any positive integer and $f_s$ is the difference between the center frequencies of adjacent channels. Thus, the center frequency of the $i$th channel is $$f_i=f_1+(i-1)f_s=\left(h+i-\frac{1}{2}\right)f_s \quad (7)$$

Each amplitude-modulated data channel is assumed to transmit at $2f_s$ bauds (symbols per second). Hence $$T=\frac{1}{2f_s} \quad (8)$$

Since the bandwidth of each channel is $2f_s$, there is no inherent difficulty in transmitting at $2f_s$ bauds for an arbitrary channel shaping.

For a given amplitude characteristic $H(f)$ of transmission medium 18, band-limited transmitting filters (15, 16, 17) can be devised to satisfy Equations 3, 4, 5 and 8 simultaneously and thereby eliminate both intersymbol and interchannel interference for a data rate of $2f_s$ per channel. At the same time the objects of this invention will be met.

I propose a general method of designing the required transmitting filters in the form of a theorem.

For a given characteristic $H(f)$ of a transmission medium, a channel amplitude characteristic $A_i(f)$ ($i=1, 2 \ldots, N$) exists such that $$A_i^2(f)H^2(f)=C_i+Q_i(f)$$

$C_i+Q_i(f)$ is greater than zero for all $f$ in the range $f_i\pm f_s$ and zero outside this range. $C_i$ is an arbitrary constant and $Q_i(f)$ is a shaping function having odd symmetries about $f_i\pm f_s/2$. Furthermore, the products of the shaping functions for adjacent channels $[C_i+Q_i(f)][C_{i+1}+Q_{i+1}(f)]$ are even functions about the frequency $(f_i+f_s/2)$ midway between adjacent channel center frequencies $f_i$ and $f_{i+1}$.

As a further part of my theorem the channel phase characteristic $\alpha_i(f)$ ($i=1, 2 \ldots, N$) can be shaped such that $$\alpha_i(f)-\alpha_{i+1}(f)=\pm\frac{\pi}{2}+\gamma_i(f) \quad (9)$$

in the frequency range between channel center frequencies. $\gamma_i(f)$ is an arbitrary phase function having odd symmetry about the frequency $(f_i+f_s/2)$ midway between adjacent channel center frequencies $f_i$ and $f_{i+1}$.

If $A_i(f)$ and $\alpha_i(f)$ are shaped in accordance with my theorem and $f_1$ is chosen according to Equation 6, then Equations 3, 4, 5, and 8 are simultaneously satisfied. There is then no intersymbol and interchannel interference for a synchronous data rate of $2f_s$ bauds per channel. Furthermore, the transmitting filters have gradual rolloffs, the overall data rate is maximized, the transmitting filters are matched to the transmission medium, and for band-limited Gaussian noise the receiver receives each of the overlapping signals with the same probability of error as if only that signal were transmitted.

Detailed proofs of my theorem are omitted here, but its practical consequences will be dealt with hereinafter. These proofs are set forth in the appendices A and B of my paper "Synthesis of Band-Limited Orthogonal Signals for Multichannel Data Transmission" published in the Bell System Technical Journal (vol. XLV, No. 10, December 1966) on pp. 1790 to 1794.

The first part of my theorem can be readily satisfied by any number om symmetrical waveshapes. The second part, relating to the product of the shaping functions of adjacent channels, can be satisfied according to the following corollary 1 to my theorem.

Under the simplifying conditions that $C_i$ is chosen the same ($C_0$) for all $i$ and all $Q_i(f)$ ($i=1, 2 \ldots, N$) are identically shaped, the product function $[C_i+Q_i(f)][C_{i+1}+Q_{i+1}(f)]$ is an even function about the frequency midway between adjacent channel center frequencies $(f_i+f_s/2)$ provided $Q_i(f)$ is an odd function about $(f_i+f_s/2)$ and is an even function about the channel center frequency $f_i$. This corollary follows directly from the theorem and needs no proof. The product of two odd functions is always an even function.

Figure 2:
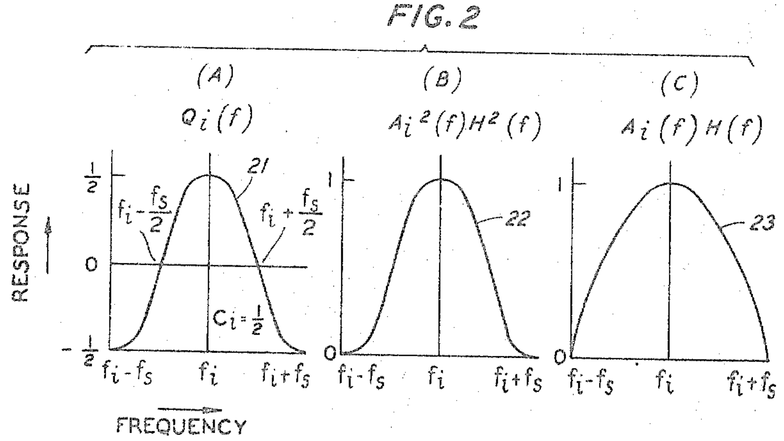
FIG. 2 is a waveform diagram showing the development of a shaping filter characteristic satisfying the condition of orthogonality according to this invention.
Figure 3:
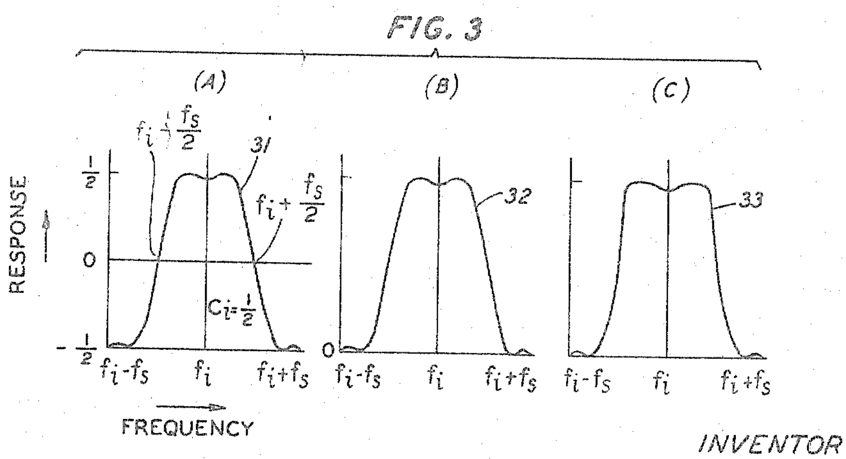
FIG. 3 is another waveform diagram showing the development of a shaping filter characteristic satisfying the condition of orthogonality according to this invention.

Practical examples of representative shaping functions that satisfy the requirements of my theorem and corollary 1 are shown in FIGS. 2 and 3.

In FIG. 2(A) waveform 21 is $$Q_i(f)=\frac{1}{2}\cos 2\pi\frac{f-f_i}{2f_s}$$

where $f$ lies between $f_i-f_s$ and $f_i+f_s$ and $i$ is any positive integer.

Choose $$C_i=\frac{1}{2}$$

and FIG. 2(B) is identical to FIG 2(A) with the zero intercept changed to coincide with the minimum value of the function. Then waveform 22 is the raised cosine function $$A_i^2(f)H^2(f)=C_i+Q_i(f)=\frac{1}{2}+\frac{1}{2}\cos 2\pi\frac{f-f_i}{2f_s}$$

From trigonometric identities the square root of this equation is $$A_i(f)H(f)=\cos\pi\frac{f-f_i}{2f_s}$$

Waveform 23 in FIG. 2(C) is seen to be the positive half-cycle of a cosine wave, having zero transmission beyond the band-edge frequencies $f_i \pm f_s$ and maximum transmission at the center frequency $f_i$.

Waveforms 21 and 22 meet the symmetry properties about $$f_i,\ f_i+\frac{f_s}{2}\text{ and }f_i-\frac{f_s}{2}$$

postulated above. Adjacent overlapping channels spaced by a frequency $f_s$ and identically shaped in this manner are readily seen to satisfy corollary 1 also.

A second example of a shaping function satisfying Equation 3 is shown in FIG. 3. Waveforms 31 and 32 are identically shaped functions similar to that of a multiple tuned circuit. The waveforms of FIGS. 3(A) and 3(B) differ only in the value of the ordinate. Waveform 33 of FIG. 3(C) is the square root of waveform 32.

It may be observed from these waveforms that the center frequency need not be the frequency of maximum response. There are dual maxima symmetrical about the channel center frequency as shown. The waveforms of FIG. 3 are not as readily characterized mathematically as those of FIG. 2, but are nevertheless practically attainable.

Reference is made to such standard texts as E. A. Guillemin's Synthesis of Passive Networks (John Wiley and Sons, Inc., New York, 1957) for filter design methods.

It can be seen from these two examples that a great deal of freedom is allowed in choosing the shaping function $Q_i(f)$. Consequently $A_i(f)H(f)$ can also assume various forms. If $H(f)$ is flat over the narrow frequency band of the individual channel, $A_i(f)$ may have the same shape as $A_i(f)H(f)$. If $H(f)$ is not flat in the individual channel band, $A_i(f)$ can be obtained from a division of the product $A_i(f)H(f)$ by $H(f)$.

My theorem also places constraints on the phase characteristic $\alpha_i(f)$ of the transmitting filters. It is only required that Equation 9 be satisfied in order to insure orthogonality between adjacent channels. However, if it is desired to have identically shaped transmitting filter characteristics for all channels, I propose the following corollary 2.

Under the simplifying condition that all transmitting filter phase characteristics $\alpha_i(f)(1=1, 2 \ldots N)$ be identically shaped, Equation 9 holds if $$\alpha_i(f)=h\frac{\pi}{2}\frac{f-f_i}{f_s}+\frac{1}{2}\varphi_0+\Sigma\varphi_m\cos m2\pi\frac{f-f_i}{2f_s}+\Sigma\psi_n\sin n2\pi\frac{f-f_i}{2f_s}$$

for $m=1, 2, 3 \ldots$ and $n=2, 4, 6 \ldots$ in the range $f_i \pm f_s$, where $h$ is an arbitrary odd integer and $\varphi_o$, $\varphi_m$, $\psi_n$ are all arbitrarily chosen.

The first term of this equation is a linear term. The second term is an intercept term which may conveniently be zero. The last two terms are ripple terms having odd symmetry about the frequencies $f_i \pm f_s/2$. The only real constraint is that $n$ be even. If $n$ were allowed to assume odd as well as even values, the form of $\alpha_i(f)$ would be completely arbitrary.

Figure 4:
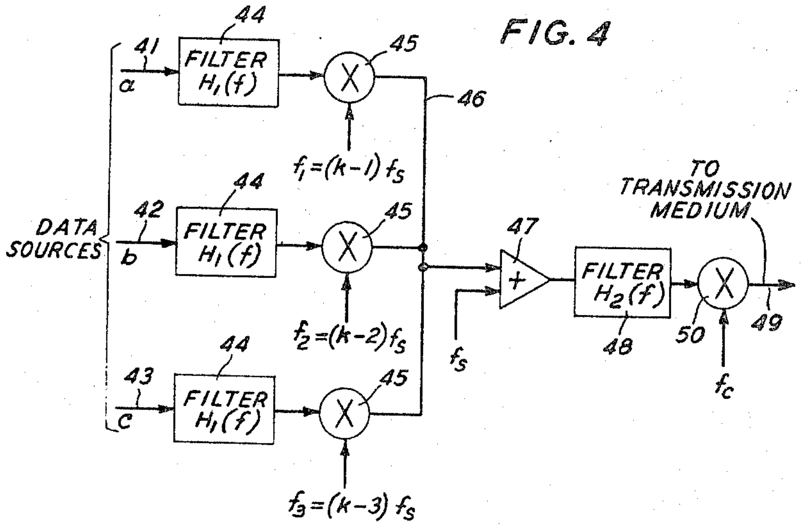
FIG. 4 is a block diagram of a representative three-channel orthogonal frequency multiplex transmitter according to this invention using identical shaping filters for all channels.

In FIG. 4 to be discussed more fully later the phase function $\alpha_i(f)$ is sketched as identical curves 56, 58, and 60. For this particular choice $h$ is set to $-1$, $\varphi_o$, and $\varphi_m$ equal zero, $m$ equals 1, $n$ equals 2 and $\psi_2=1$. The linear term is thus $-\pi/2$ and a sine function with odd symmetry about $f_i \pm f_s/2$ is superimposed thereon.

It is readily appreciated that the phase characteristic $\alpha_i(f)$ is independent of the amplitude characteristic $A_i(f)$. Further, the phase function of the channel is absent from both corollaries 1 and 2. Hence, the amplitude and phase characteristics of the transmitting filters can be synthesized independently of each other and of the phase characteristic of the transmission medium.

Variations in the amplitude characteristic $H(f)$ can be taken into account for each individual channel. However, it may be more convenient to use a single compensating network for the entire bandwidth of the transmission medium. For convenience in implementation the amplitude offset $C_i$ and shaping functions $Q_i(f)$ can be chosen in an identical manner for all channels, according to my corollaries 1 and 2. Then $A_i(f)H(f)$ will be identical (except for a shift in center frequencies) for all channels. This permits the use of identical shaping filters for all channels coupled with frequency translation to the equally spaced center channel frequencies.

Figure 5:
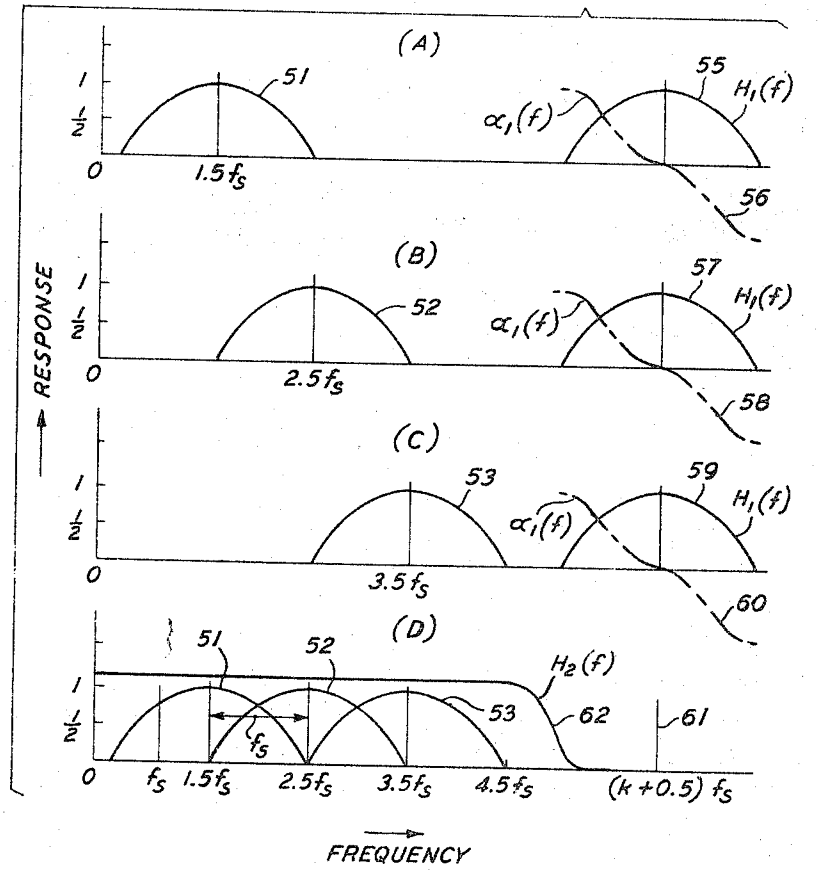
FIG. 5 is a series of waveform diagrams useful in explaining the operation of the system of FIG. 4.

FIG. 4 illustrates in block diagram form a three-channel system using identical channel shaping filters plus frequency translations. FIG. 5 is a waveform diagram useful in explaining the transmitter of FIG. 4.

In FIG. 4 data sources *a*, *b*, and *c* (not shown) deliver synchronized impulse samples to lines 41, 42, and 43 which in turn are connected to identical shaping filters 44 having an amplitude characteristic $H_1(f)$ and a phase characteristic $\alpha_i(f)$ as shown in FIG. 5. Characteristics $H_1(f)$ and $\alpha_i(f)$ have the properties described in corollaries 1 and 2. Filters 44 are bandpass filters of $2f_s$ bandwidth centered on a frequency lying outside the transmission band of the transmission medium. Here this center frequency is chosen for convenience as $(k+0.5)f_s$, $k$ being an arbitrary odd integer.

The waveforms of FIG. 5 use frequency as the abscissa and amplitude and phase as the ordinate. In FIG. 5 line (D) vertical line 61 on the right side indicates the center frequency of filters 44 at the frequency $(k+0.5)f_s$. On lines (A), (B), and (C) of FIG. 5 the identical amplitude characteristics 55, 57, and 59, shown here as the half cycle of a cosine wave, are centered on the frequency $(k+0.5)f_s$. The phase characteristics $\alpha_i(f)$ in broken line form are superimposed on the amplitude characteristics as identical waveforms 56, 58, and 60. The average slope is linear and the difference in slope between channels is equal to $-\pi/2$. A sinusoidal phase ripple is also present. Since all three waveforms 55, 57 and 59 are derived from identical filters, their amplitude, as well as their phase, characteristics 56, 58 and 60, are also identical.

The shaped outputs of filters 44 are modulated by equally spaced frequencies $f_1$, $f_2$, and $f_3$ in modulators 45. The frequency $f_1$ is chosen equal to $(k-1)f_s$ to form a lower sideband centered on a frequency of $1.5f_s$ as shown by waveform 51 on line (A) of FIG. 5. This waveform has a bandwidth extending from $0.5f_s$ to $2.5f_s$. Similarly, frequencies $f_2$ and $f_3$ are chosen respectively to be $(k-2)f_s$ and $(k-3)f_s$ to form lower sidebands 52 and 53 on lines (B) and (C) of FIG. 5. The new center frequencies are $2.5f_s$ and $3.5f_s$. The center frequency spacing is clearly $f_s$.

The translated outputs of modulators 45 are combined on line 46 and result in the overlapping spectra 51, 52, and 53 on line (D) of FIG. 5. In adder 47 connected to line 46 a component at the frequency $f_s$ is inserted to facilitate demodulation at a receiver. To eliminate the upper sidebands in the outputs of modulators 45 and to confine the transmitted spectrum to the bandwidth of the transmission medium the signal from adder 47 is applied to low-pass filter 48 having the flat amplitude characteristic $H_2(f)$ out to the frequency $4.5f_s$ shown in waveform 62 on line (D) of FIG. 5. The composite signal in the output of filter 48 is translated in modulator 50 on a carrier frequency $f_c$ and then appears on line 49 for application to a connected transmission medium.

The passband of the transmission medium is assumed to be centered on the frequency $f_c$.

Since the transmission rate in each channel is $2f_s$ bauds, the total transmission rate for three channels is $6f_s$ bauds in a transmission band of $4f_s$. This is a rate of 1.5 bauds per cycle of bandwidth, 50 percent greater than that possible by use of conventional nonoverlapping frequency spectra. By extension of the principle of this invention it is apparent that the more channels used, the closer is the approach to the theoretical maximum of 2 bauds per cycle of bandwidth. In general $$\frac{N}{N+1}$$

times 2 bauds per cycle of bandwidth is obtained, where N is the number of channels used.

Figure 6:
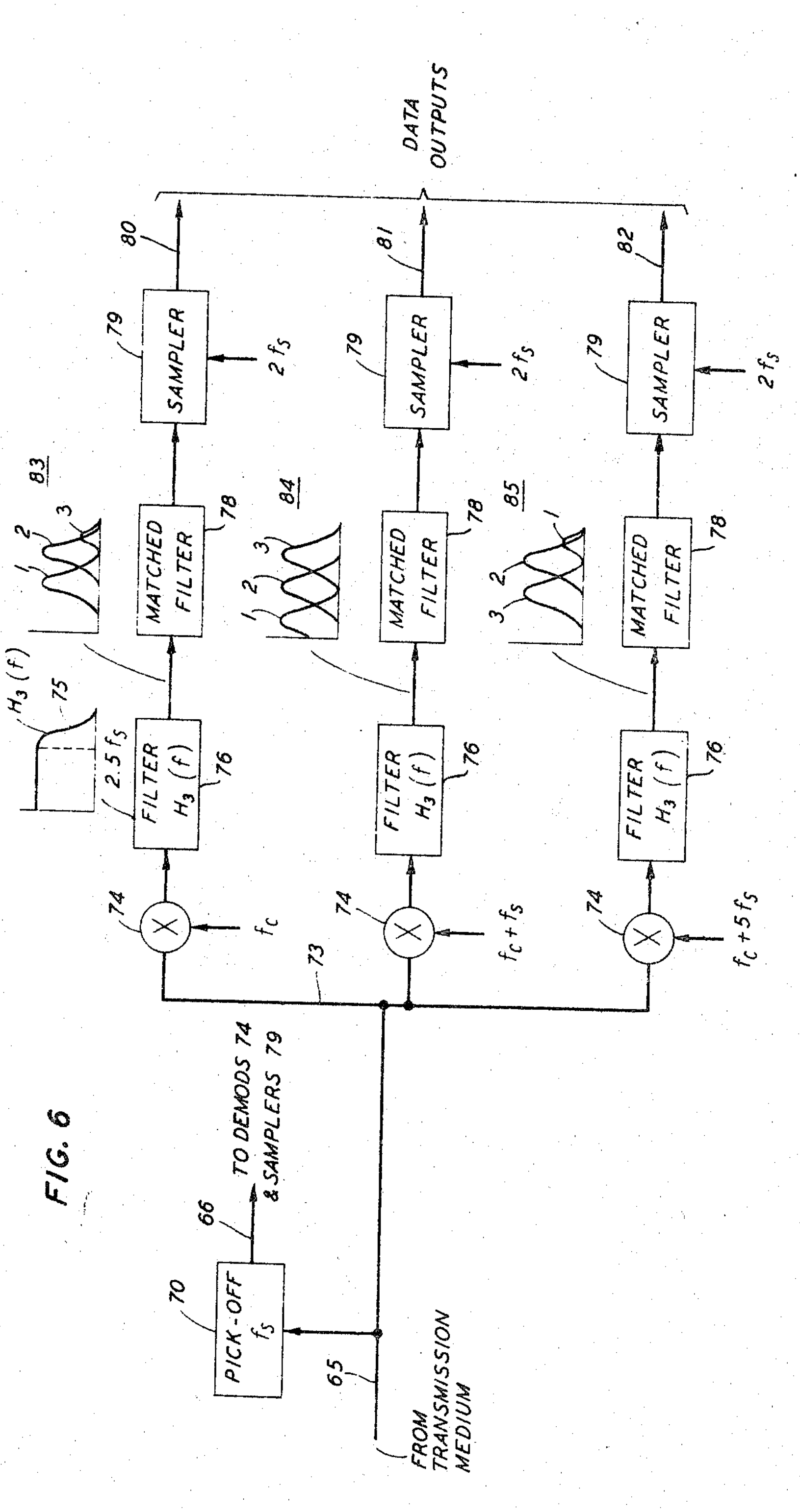
FIG. 6 is a block diagram of a representative correlation detection system capable of recovering the data signals generated in the transmitting system of FIG. 4.

The data in individual channels of a composite signal as shown on line (D) of FIG. 5 can be demodulated and detected by the use of adaptive correlation techniques as shown in the block diagram of FIG. 6. The composite signal arriving on line 65 after having traversed the transmission medium has the reference frequency $f_s$ removed in pickoff device 70. Pickoff 70 may comprise a narrowband filter and frequency multipliers by means of which the sampling frequency $2f_s$ and the several demodulating carriers are derived for application to conductor 66. Pickoff 70 can alternatively be placed to the right of upper modulator 74, if desired. The received signal is next applied to modulators 74, having demodulating frequencies chosen to translate the respective channel bandwidths to a common frequency range. This frequency range is defined by the characteristic $H_3(f)$ of low-pass filters 76. The characteristics of filters 76 are identical as shown in waveform 75. The characteristic is flat to $2.5f_s$ cycles and falls off to zero beyond that frequency.

On the top line channel 1 is translated back to its baseband position centered on the frequency $1.5f_s$ by demodulation with a frequency $f_c$, the same carrier frequency used at the transmitter. In passing through filter 76 channel 3 is severely attenuated and channel 2 to a lesser extent as shown in waveform 83. Only channel 1 produces a full response, however. On the middle line channel 2 is translated to the baseband position centered on a frequency of $1.5f_s$ by demodulation with a frequency of $f_c+f_s$. Filter 76 has an output as shown in waveform 84. Finally on the bottom line channel 3 is translated to the baseband position centered on a frequency of $1.5f_s$ by demodulation with a frequency $f_c+5f_s$. The respective channels now appear in reverse order as shown in waveform 85. All three chanels have been translated into a position in the frequency spectrum which satisfies Equation 7. The signals in each individual channel remain orthogonal in time. The overlapping frequency spectra occur only between pairs of channels and the phase differences are unchanged. The signals in these channels thus remain mutually orthogonal in frequency. The remaining channel on each line does not overlap the desired channel in the baseband position and can therefore produce no interference.

The outputs of filters 76 are in turn applied to matched filters 78, which function as correlators. A matched filter is a linear system whose impulse response is the time inverse or complex conjugate of the waveform of the signal to which it is being matched. A matched filter is usually implemented by a tapped delay line with weighting resistors between each tap and a summing circuit. The weighting resistors are set according to samples at the corresponding taps when the waveform desired to be matched is transmitted through the system and exhibits its maximum response at a reference tap whose output is arbitrarily taken as the unity value. The taps are preferably equally spaced at the reciprocal of twice the bandwidth of the system being matched. In the present case the baseband width of interest is approximately $3f_s$ (waveform 75) and therefore the tap spacing is $1/6f_s$. The weighting resistors are adjusted before data transmission by taking samples of the desired waveform after it has been transmitted through the channel. The output of the summing circuit is observed at a time $\tau$ when the peak response is noted at the reference tap. Thereafter, the response of the matched filter will be a maximum for the waveform for which the filter has been adjusted. The signal in the adjacent channel is orthogonal to that in the channel of interest and its contribution to the output of the summing circuit at time $\tau$ will be zero.

Reference is made to the paper of G. L. Turin entitled "An Introduction to Matched Filters" published in IRE Transactions on Information Theory of June 1960 for more details on the use of matched filters as correlators.

At the output of each matched filter 78 is a sampler 79 controlled by sampling pulses at the data rate $2f_s$ derived from pick-off 70. The sampling pulses are delayed by the time $\tau$ to coincide with the arrival of the peak response on the reference tap of the matched filter. On the basis of the summed sample the decision is made as to the nature of the data bit transmitted. The data output is made available on leads 80, 81, and 82 for the respective channels. Thus, the system of this invention operates in real time and no signal storage, other than a fixed delay, is needed.

Where larger numbers of channels than three are used, the three-channel method above may be extended in a straightforward manner. For example, the channels may be separated in groups of three using bandpass filters and each group of three may then be translated down to baseband in the manner previously described. The group of three passing through the bandpass filter is initially translated to baseband by using a demodulating signal of the form $\cos\ [2\pi(i\text{-}1)f_st\Theta_i]$ where $i$ is the center frequency of the center channel of the group of three and $\Theta_i$ is an arbitrary phase angle accounting for carrier phase shift in the transmission medium.

The orthogonal multiplex system of this invention can also be operated without synchronization among channels if transmission is restricted to odd or even numbered channels. The overall data rate is then half the theoretical maximum or one baud per cycle of bandwidth. The system may also be operated with some adjacent channels synchronized and others unsynchronized, provided that an unused channel is left between synchronized groups.

While this invention has been described generally in theoretical terms and specifically by way of a three-channel example, its principles are susceptible of wide application by those skilled in the art within the spirit and scope of the appended claims.

What is claimed is:

1. In a frequency-multiplex communications system:

a transmitting station for forming a plurality of equally spaced band-limited mutually orthogonal communication channels in said system;

a transmission medium having a substantially flat amplitude-frequency characteristic and connected to said transmitting station;

a plurality of input circuits for data signals;

means synchronizing said input circuits at a common transmission rate equal to one data symbol per cycle of bandwidth; and a transmitting bandpass filter for each of said input circuits, each of said filters having a center frequency equally spaced by half the synchronizing rate from that of an adjacent filter, a bandwidth equal to the synchronizing rate, even symmetry about the center frequencies for its amplitude response, odd symmetry about frequencies midway between the center frequencies and band-edge frequencies for the square of its amplitude response characteristic, and phase-frequency characteristics differing between adjacent communication channels by 90 electrical degrees plus an arbitrary phase function, with odd symmetry for said phase-frequency characteristic about a frequency midway between adjacent center frequencies.

2. The frequency-multiplex system of claim 1 in which each of said transmitting filters has an amplitude-frequency characteristic proportional to the positive half cycle of the cosine function cos $\alpha$, where $\alpha$ is $\pi$ times said transmission rate and the ratio of the difference between the center frequency of any channel and every other frequency within the channel bandwidth.

3. The frequency-multiplex system of claim 1 in which each of said transmitting filters has an amplitude-frequency response characteristic between band-edge frequencies whose square is proportional to $C_o+Q_i(f)$, where $C_o$ is an arbitrary constant and $Q_i(f)$ is a response function having even symmetry about its center frequency and odd symmetry about frequencies midway between the center frequency and each band-edge frequency.

4. The frequency-multiplex system of claim 3 in which $$C_o \text{ equals } \frac{1}{2}$$

and $Q_i(f)$ equals the raised cosine function $$\frac{1}{2} \cos 2\pi \frac{f-f_i}{2f_s}$$

where $f$ is any frequency within the bandwidth of a given channel $i$, $f_i$ is the center frequency of channel $i$, $f_s$ is half the common data transmission rate, and $i$ is any positive integer.

5. In a frequency-multiplex communication system:

a transmitting station for forming a plurality of equally spaced orthogonal communication channels in said system;

a transmission medium for said system having a substantially flat amplitude-frequency characteristic and an arbitrary phase-frequency characteristic over a given bandwidth;

a plurality of input circuits for data signals;

means synchronizing said input circuits at a common transmission rate equal to one data symbol for each cycle of bandwidth;

a transmitting bandpass filter for each of said input circuits, each of said filters having a center frequency above the band limit of said transmission medium, a bandwidth equal to said transmission rate, even symmetry about the center frequency for its amplitude response, odd symmetry for the square of its amplitude response about frequencies midway between the center frequency and the band-edge frequencies, and an average phase-frequency response having a linear slope;

means generating a plurality of carrier frequencies equally spaced by half said transmission rate;

a plurality of modulating means controlled by said generating means translating the responses of said transmitting filters to adjacent overlapping frequency bands within the passband of said transmission medium;

means combining the outputs of said modulating means with a frequency component from said synchronizing means related to said transmission rate; and means connected to said combining means translating all frequency components to the given passband of said transmission medium.

6. An orthogonal multiplex data communications system comprising in combination:

a transmitting station and a remotely located receiving station with a transmission medium of limited passband therebetween;

a plurality of input circuits for data signals;

means for synchronizing all said input circuits at a common transmission rate;

a plurality of bandpass filters associated one each with said input circuits shaping said data signals such that the square of the product of the amplitude characteristics of said filters and of said transmission medium is a response function having even symmetry about a frequency beyond the passband of said medium, a passband equal to said transmission rate, odd symmetry about frequencies midway between the center frequency and band-edge frequencies and a linear average phase-frequency characteristic;

modulating means translating waveforms from said filters to overlapping narrow frequency bands within the passband of said medium and centered on frequencies separated by half said transmission rate;

combining means for said translated waveforms;

means inserting a transmission rate frequency component into said combined waveforms;

a low-pass filter confining said combined waveforms to the passband of said transmission medium;

means at said receiving station deriving demodulating carrier waves and a sampling wave from the transmission rate frequency component in the received signal;

means responsive to said derived carrier waves translating each narrow frequency band in the received signal to a baseband position in the frequency spectrum;

further low-pass filter means for each of said narrow frequency bands;

matched filter means correlating the energy in said narrow frequency bands with the time inverse of the transfer function of said transmission medium;

means sampling the correlation products from said matched filter at said derived transmission rate; and a data output connected to each of said sampling means.

7. The data communications system of claim 6 in which said translating means at said receiving station comprises modulating means responsive to selected demodulating carrier wave frequencies translating the individual narrow-band channels in the received signal to the lowest baseband channel position.

8. The data communications system of claim 6 in which said matched filter means comprise a delay line with a plurality of taps spaced by the reciprocal of twice the bandwidth of each narrow band channel;

an adjustable attenuator for each tap on said delay line;

a summing circuit for the attenuated tap outputs; and means adjusting the attenuators for each delay line tap according to samples of the impulse response of a test pulse transmitted through said system such that the adjusted response of said matched filter is a mirror image in time of said impulse response.

9. The method of orthogonal multiplex data transmission which comprises shaping a plurality of input data signals such that their individual frequency responses are confined to equally spaced channels having overlapping spectra, a bandwidth equal to the transmission rate per channel, even symmetry about the center frequency of each channel, odd symmetry for the square of said responses about frequencies midway between the center frequency and the band-edge frequencies of each channel and phase characteristics between adjacent channels differing by 90 electrical degrees; combining the several channels into a composite signal; and filtering the composite signal to confine it to the finite passband of a transmission medium.

10. The method of orthogonal multiplex data transmission which comprises shaping a plurality of input data signals to confine their response to an arbitrary narrow passband constrained such that even symmetry of frequency response exists about a center frequency of such response, odd symmetry of the square of the response exists about frequencies midway between the center frequency and frequencies at the edges of the narrow passband, and the average phase-frequency characteristic is linear; translating each of the shaped data signals to adjacent overlapping channels of a bandwidth equal to the common transmission rate of said data signals and centered on frequencies separated by half the data transmission rate; combining the shaped and translated data signals into a composite signal; inserting a data rate frequency component into said composite signal; and filtering said composite signal to conform to the restricted passband of a transmission medium.

References Cited

UNITED STATES PATENTS

| | | | |
|---|---|---|---|
| 3,163,718 | 12/1964 | Deman | 179—15 |
| 3,349,182 | 10/1967 | Ito | 179—15 |

RALPH D. BLAKESLEE, Primary Examiner

ALBERT B. KIMBALL, Jr., Assistant Examiner

U.S. Cl. X.R.

179—15.55; 333—70